United States Patent
Bakeev et al.

(10) Patent No.: US 7,550,542 B2
(45) Date of Patent: *Jun. 23, 2009

(54) COLORANT COMPATIBLE SYNTHETIC THICKENER FOR PAINT

(75) Inventors: Kirill N. Bakeev, Newark, DE (US); De-Kai Loo, Wilmington, DE (US); Angie H. Ma, Newark, DE (US); Tuyen T. Nguyen, Newark, DE (US); Jeffrey K. Politis, Arden, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/031,187

(22) Filed: Jan. 7, 2005

(65) Prior Publication Data

US 2005/0150418 A1   Jul. 14, 2005

Related U.S. Application Data

(60) Provisional application No. 60/534,873, filed on Jan. 8, 2004.

(51) Int. Cl.
*C08L 71/02* (2006.01)

(52) U.S. Cl. .................. 525/409; 524/876; 528/125

(58) Field of Classification Search .............. 525/409; 524/876; 528/125
See application file for complete search history.

(56) References Cited

U.S. PATENT DOCUMENTS

| | | | | |
|---|---|---|---|---|
| 2,065,150 | A | 12/1936 | O'Brien | 229/15 |
| 4,288,639 | A | 9/1981 | Camp | 568/625 |
| 4,354,956 | A | 10/1982 | Camp | 252/316 |
| 4,411,819 | A | 10/1983 | Panek et al. | 252/313.1 |
| 4,426,485 | A | 1/1984 | Hoy et al. | 524/591 |
| 4,432,881 | A | 2/1984 | Evani et al. | |
| 4,530,994 | A * | 7/1985 | Shimizu et al. | 525/403 |
| 4,665,239 | A | 5/1987 | Panek et al. | 568/624 |
| 4,673,518 | A | 6/1987 | Owens et al. | 252/75 |
| 4,709,099 | A | 11/1987 | Panek et al. | 568/624 |
| 4,810,503 | A | 3/1989 | Carson et al. | 424/76.3 |
| 5,574,127 | A * | 11/1996 | Sau | 528/125 |
| 6,162,877 | A * | 12/2000 | Sau | 525/403 |
| 6,337,366 | B1 | 1/2002 | Amick et al. | |
| 2002/0188040 | A1* | 12/2002 | Chen et al. | 524/35 |
| 2002/0193469 | A1* | 12/2002 | Kawaguchi et al. | 524/86 |
| 2004/0229998 | A1* | 11/2004 | Sau | 525/54.3 |
| 2005/0039635 | A1* | 2/2005 | Yang et al. | 106/31.89 |
| 2005/0176889 | A1* | 8/2005 | Kodama et al. | 525/176 |

FOREIGN PATENT DOCUMENTS

| | | |
|---|---|---|
| EP | 0 138 614 | 1/1989 |
| EP | 0 323 627 A | 7/1989 |
| EP | 0 718 310 A | 6/1996 |
| WO | WO03/082945 A1 | 10/2003 |
| WO | WO 03082945 | * 10/2003 |

OTHER PUBLICATIONS

F. Liu, Y. Frere, J. Francois, Association properties of poly(ethylene oxide) modified by pendant aliphatic groups, 2001, Polymer, 42, 2969-2983.*
Fred W. Billmeyer, Jr., Textbook of Polymer Science, 1962, pp. 442-443, Interscience Publishers, New York, USA.
Elliott et al., Associative Polymers in Aqueous Media, J. E. Glass (Ed), ACS Symposium Series 765, Chapter 10, pp. 163-178 (2000).
Vikolox® Products, 1,2, Epoxy Alkanes, Dec. 2008.
Associative Properties of Poly(ethylene oxide) Modified by Pendant Aliphatic Groups, Liu et al., Polymer, 42, pp. 2969-293 (2001).
Polymerization of Hydrophobically Modified Polyacrylamide, Peer, William J., Advances in Chemical Series, vol. 223, pp. 383-397 (1989).

* cited by examiner

*Primary Examiner*—Randy Gulakowski
*Assistant Examiner*—Alicia M Toscano
(74) *Attorney, Agent, or Firm*—Robert O'Flynn O'Brien; Joanne Rossi

(57) ABSTRACT

A synthetic polymer has a water-soluble or water-swellable polymer backbone and terminal groups and/or intermediate groups of blocks of hydrophobes of alkyl- or aryl compounds containing a polymerizable cyclic monomer or a polymerizable double bond (or alkene) group or derivatives thereof. The blocks of hydrophobes are composed of two or more units of the same or different hydrophobes. These synthetic polymers are used as rheology modifiers, especially in latex paints.

22 Claims, No Drawings

COLORANT COMPATIBLE SYNTHETIC THICKENER FOR PAINT

This application claims the benefit of U.S. Provisional Application No. 60/534,873, filed Jan. 8, 2004.

FIELD OF THE INVENTION

This invention relates to paint compositions using colorant compatible synthetic thickeners. More specifically, the invention relates to the use in paint compositions a synthetic thickener with a water-soluble or water-swellable polymer backbone that has terminal groups of hydrophobes of oligomers of alkyl- or aryl compounds containing a polymerizable cyclic monomer (i.e., an epoxide, a glycidyl ether, a cyclic oxide, an oxazoline) or a polymerizable double bond (i.e., styrene, vinyl ether, acrylamides, acrylates), or derivatives thereof.

BACKGROUND OF THE INVENTION

Hydrophobically modified water-soluble polymers of various types have been used to thicken latex paints to provide a certain performance during manufacturing, storage, and applications. Some of these properties include: ease of formulation, pigment settling prevention, film build during application, spatter resistance, low sag, good flow, and leveling of the paint film. These water-soluble polymers may come from a natural source like cellulose, starch, polydextran, guar gum or their ionic and non-ionic derivatives (hydroxy ethyl, hydroxypropyl). Some examples of synthetic water-soluble polymers are the polyacrylamides, polyacrylates, polyvinyl alcohol, polyvinyl sulfonates, polyethylene imine, polydadmac, polyamideazetidinium ion, polyvinylpyrolidone, polyaspartates, polyacetalpolyether, polyalkylethers, and polyalkylthioethers. Most of the water soluble polymer types are described in "Water soluble polymers" by Yale Meltzer (Noyes Data Corporation, Parkridge, N.J., USA, 1981).

The hydrophobe attachment is usually done with a single alkyl group or an alkyl phenol ethoxylate bearing a halide or an epoxide. There are also examples where the hydrophobe is bunched together before the attachment as in U.S. Pat. No. 4,426,485, U.S. patent application Ser. No. 0045724 A1 (2002), U.S. Pat. Nos. 5,292,828, and 6,337,366. In these patents, the hydrophobes are pre-connected with each other via a connecting reagent such as diisocyanate, diepoxide, epichlorohydrin or a primary amine.

SUMMARY OF THE INVENTION

The present invention is directed to a polymer composition comprising a water soluble or water swellable synthetic polymer backbone that has covalently connected ends and/or intermediate blocks of oligomeric hydrophobes that are selected from the group consisting of i) alkyl and aryl moieties containing a polymerizable cyclic monomer, ii) a polymerizable double bond, and iii) derivatives of i) and ii), wherein the blocks are two or more units of the same or different hydrophobes.

The present invention also comprehends a process for preparing the water soluble or water swellable polymer composition mentioned above comprising a) reacting a water soluble or water swellable backbone polymer with a catalyzing agent in order to activate the polymer backbone, b) adding the oligomerizing hydrophobic monomer(s) to the reaction mass, and c) polymerizing the reaction mass at sufficient temperature and for a sufficient time in order to add the oligomerizing hydrophobic monomer(s) to the backbone either as end groups or intermediate groups.

This invention also relates to an aqueous protective coating composition comprising (a) the above mentioned polymer composition, (b) a colorant, and (c) a film forming latex, wherein the viscosity of the aqueous protective coating composition remains unchanged or has an insignificant loss as compared to when using conventional rheology modifiers upon adding the colorant.

DETAILED DESCRIPTION OF THE INVENTION

A new class of hydrophobically modified water-soluble/water dispersible polymers has been found that provide good thickening, leveling, and sag properties in waterborne coatings that can be used alone without other additives in the coating formulation needed in the past for tailoring the formulation for balancing these properties. It has been found that all that is necessary is to provide synthetic, water soluble polymeric backbone structures with the capacity to be dissolved in water or swellable in water to the degree necessary for the application at hand that has been modified in accordance with the present invention. The new class of rheology modifiers is a hydrophobically modified polymer that has a water-soluble or water swellable backbone portion and oligomeric hydrophobe portion(s) in the form of blocks of units. The oligomeric hydrophobic block has the following chemical architecture:

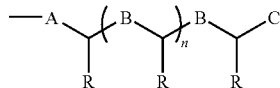

where:

n is an integer from 1-100

R is an alkyl or aryl group having from 2 carbons to 100 carbons. The alkyl group may be saturate or unsaturated, cyclic or non cyclic, linear or branched, or halogenated, i.e., fluorinated, chlorinated, or brominated. The alkyl and aryl groups may be, substituted, such as alkylsiloxane, alkylether, arylalkylether, alkylarylene ether, alkylene ether, alkyl thioether, alkylene thioether, alkyl amine, dialkyl amine, dialkyl amine oxide, triakyl ammonium, diaryl amine, dialkyl phosphine, diaryl phosphine, dialkyl phosphine oxide, diaryl phosphine oxide, dialkyl phosphate and the like.

A is a connecting diradical of —O—, —S—, —CH$_2$—, —O—CH$_2$—, —S—CH$_2$—, —NH—, —NR'—, —NH—CH$_2$—, —NR—CH$_2$—, —PR'—, —POR'—(where R'=1 to 12 carbons), polyalkylene ether (Mw=44 to 50000), polyalkylene isocyanate-HEUR (Mw=100 to 50,000).

B is a connecting groups of: —CH$_2$—, —CH$_2$O—, CH$_2$S—, —CH$_2$—NH—, —CR"H—O—, —CR"H—S—, —CR"H—NH—, and —CH$_2$NR"—(where R"=1-12 carbons).

C is a connecting end same as A or a terminating end equal to: —OH, SH, —NHR'", —OR'", —SR'", and —H.

Several specific chemical structures are shown below to illustrate this hydrophobe architecture.

Structure 1

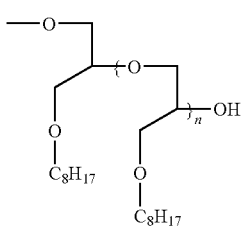

In this case, A=—OCH$_2$—, B=—O—CH$_2$—, R=—CH$_2$O—C$_8$H$_{18}$ and C=—OH.

Structure 2

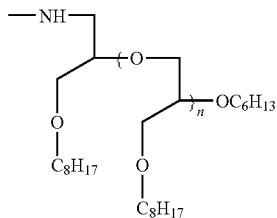

In this example, A=—NHCH$_2$—, B=—O—CH$_2$—, R=—CH2O—C$_8$H$_{18}$ and C=OC$_6$H$_{13}$.

Structure 3

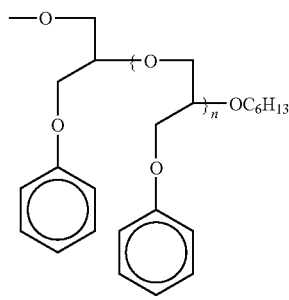

In this structure, A=—OCH$_2$—, B=—OCH$_2$—, C=—C$_6$H$_{13}$ and R=—OC$_6$H$_5$.

Structure 4

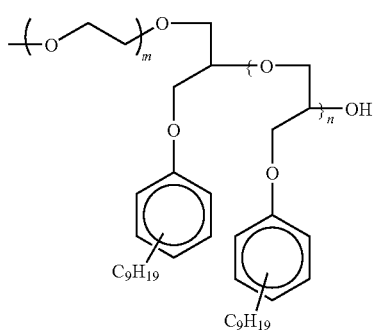

In this structure, A=Polyalkylene oxide-CH$_2$—, B=—O—CH$_2$—, C=—OH, and R=nonylphenoxy.

Structure 5

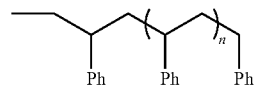

In this structure, A=—CH$_2$—, B=—CH$_2$—, C=H and R=Ph. (note, Ph is a phenyl moiety).

Structure 6

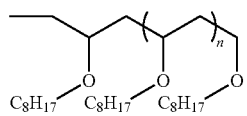

In this structure, A=—CH$_2$—, B=—CH$_2$—, C=—H, and R=—O—C$_8$H$_{17}$.

These hydrophobe blocks could be synthesized from corresponding alkyl glycidyl ether (or thio or amido) by heating with a base or a proper nucleophile of choice. Structures 1-4 are products of alkyl glycidyl ethers. Control oligomerization like atom transfer polymerization, living radical polymerization, cationic polymerization, anionic polymerization and group transfer polymerization with proper quenching reagent would yield desired hydrophobe from reactive vinyl monomers such as styrene, vinyl ether, vinyl ester, acrylate esters, acrylamide ester. Structure 5 and 6 are product examples of control radical oligomerization and proper end-capping.

The hydrophobe blocks may be connected to the water soluble/water dispersible polymer via an ether, ester, urethane, amide, amine, imide, or urea, depending of the choice of one who is skilled in the art. The connection could be done via a diepoxide, a diisocyanate, a dialkyl halide, diester, or a compound bearing mix reactive groups (for example, epoxyalkylhalide, alkylhalide isocyanate).

The commonly practiced procedure to attach a hydrophobe to a water soluble/water dispersible polymer bearing reactable hydroxyl groups such as cellulose derivatives is by heating the cellulose alkaline derivative with a hydophobe halide or epoxide. One example of this type of reaction is the synthesis of hydrophobically modified hydroxyethyl cellulose (HMHEC). Both an alkyl halide or an alkyl glycidyl ether can be used as a hydrophobe modifier. Therefore, it is possible to convert the hydrophobe of this invention to an epoxide (using epihalohydrin), or an halogenating reagent like PBr$_3$ or PCl$_5$ to form a reactive hydrophobe.

It is more convenient to incorporate this type of hydrophobe to an addition polymer (vinyl alcohol, acrylamide, acrylates.) via a monomer bearing this hydrophobe. For example, acryloyl ester of this type of hydrophobe from Structure 4 could be polymerized along with acrylic acid and acrylamide to give the corresponding hydrophobically modified alkaline soluble emulsions (HASE).

It is also convenient to make telechelic polyurethane of hydrophobically modified ethylene oxide urethane block copolymer (HEUR) using a pre-made hydrophobe. The hydrophobe containing one hydroxyl or two hydroxyl groups could be added to a mixture of polyethylene oxide with reactive hydroxyl end group then allowed to react with a diisocyanate. It is, however, most convenient to make the HEUR backbone and heat the resultant oligomers with an alkyl glycidyl ether of choice. The alkyl glycidyl ether moiety oligomerizes at the end of the HEUR backbone to give the telechelic HEUR.

It is most convenient to just heat a mixture of polyethylene glycol and an alkyl glycidyl ether in the presence of a base in order to make hydrophobically modified PEG. The polymer backbone could be pre-modified with one or several alkyl diols or alkyl triol to form a branched structure, or converted to an acetal-polyether as described in U.S. Pat. Nos. 5,574,127 or 6,162,877. The reaction scheme below illustrates the ease of synthesis of the telechelic polymer of this type.

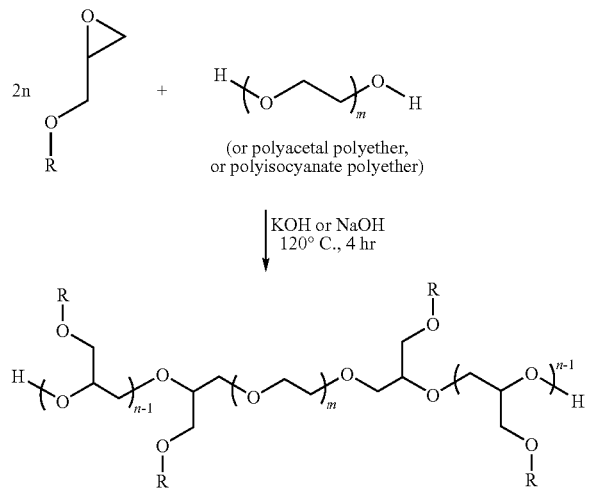

The present invention is an associative polymer that has a water-soluble or water-swellable backbone that is a synthetic polymer. This backbone can be derived from a wide selection of materials such as polyacrylamides, polyacrylates, polyvinyl alcohol, polyvinyl sulfonates, polyethylene imine, polydadmac, polyamideazetidinium ion, polyvinylpyrolidone, polyaspartates, polyacetalpolyether, polyalkylethers, and polyalkylthioethers. Most of the water soluble polymer types are described in "Water soluble polymers" by Yale Meltzer (Noyes Data Corporation, Parkridge, N.J., USA, 1981). The backbone alone is not reactive and can be any of the synthetic polymers mentioned above as long as the backbone polymer is water soluble or water swellable. The backbone becomes a reactive site when the hydrophobes are internally connected in the backbone or are pendant from the backbone. The hydrophobes can also be terminal groups (also known as telechelic groups) on the backbone. The backbone polymer can be linear or branched or dendritic in shape (i.e., a configuration where three branches are attached to a single atom such as a carbon atom). When the hydrophobic oligomeric blocks are alkyl and aryl moieties containing a polymerizable cyclic monomer, the total number of carbon atoms in the akyl or aryl portions of the hydrophobic oligomeric groups can be from 1 to 100.

The oligomeric hydrophobic blocks of moieties are the reactive sites. The blocks of hydrophobic moieties must have at least two units, preferably at least 3 units, more preferably at least 7 units, and more preferably 10 units. It should be understood that more that 10 units can be present in the hydrophobic moieties and that the number of units are only limited by the feasibility and economics of making such moiety based on the size, structure, steric hindrance, and other chemical or physical forces acting on the closeness of the units attached in the blocks.

In accordance with this invention the oligomeric hydrophobes can be an alkyl or aryl moiety containing a polymerizable cyclic monomer or a polymerizable double bond, or derivatives of these moieties. When the hydrophobe is an alkyl moiety containing a polymerizable cyclic monomer, the alkyl group can have 1 to 40 carbon atoms, preferably 3 to 24 carbons, and more preferably 6 to 18 carbons. When the hydrophobe is an aryl moiety containing a polymerizable cyclic monomer, the aryl group can have 6 to 40 carbon atoms, preferably 6 to 29 carbons, and more preferably 7 to 15 carbons. Examples of the polymerizable cyclic monomers are alkyl glycidyl ethers, aryl glycidyl ethers, arylalkyl epoxide, alkyl oxazoline, and aryl oxazoline.

When the hydrophobe is a polymerizable double bond, it can be an alkene monomer such as styrene and stryenic compounds, vinyl compounds, acrylates and derivatives thereof, norbornenes and derivatives thereof, and alkenes and derivatives thereof, alkenyl siloxanes and derivatives thereof, alkenyl silanes and derivatives thereof, fluorinated and perfluorinated alkenes. Examples of alkenes are ethylene, propylene, butylene, etc.

In accordance with the present invention, the polymer composition has a weight average molecular weight (Mw) with the upper limit of the polymer being about 10,000,000, preferably about 1,000,000, and more preferably about 100,000. The lower limit of the weight average molecular weight of the polymer is about 400, preferably about 1,000, and more preferably about 4,000.

One application for this type of hydrophobically modified water-soluble polymer is paint formulation. These paint formulations are latex based, such as acrylic based, vinyl acrylic based or styrene based. It has been found that the telechelic polymers of the present invention provide balance properties in various paint formulations. However, unexpectedly, for acrylic paint (SG10 M), the resultant paint also showed excellent viscosity retention upon (VRT) tinting with various colorants. This type of performance is not seen in the regular hydrophobe polymers alone.

In latex paint formulations, the polymer of the present invention can be used alone or in combination with other conventional prior art rheology modifiers (or thickeners) such as hydroxyethylcellulose (HEC), hydroxypropyl cellulose (HPC), methylcellulose (MC), carboxymethylcellulose (CMC), methylhydroxy ethylcellulose (MHEC), ethylhydroxyethylcellulose (EHEC), and hydrophobically modified hydroxyethylcellulose (HMHEC). The typical latex paint formulations of this invention are acrylic based, vinyl acrylic based, or styrene based. These latex-based paints have pigment volume concentration (PVC) of from 15 to about 80.

Below are a series of examples showing the synthesis of telechelic hydrophobically modified PEG and polyacetal ether and their performance in two paint formulations: SG10 M and UCAR 379G (vinyl acrylic based paint). All parts and percentages are by weight unless otherwise stated.

EXAMPLE 1

PEG 20K, 16.4% Addition Level of glycidyl 2 methyl phenyl ether

In a 250 mL, round bottom 3-neck flask equipped with a condenser, a nitrogen in/out let, a mechanical stirrer, a thermo-watch and a heating mantle, a mixture of 30 g of 20,000 Mw PEG (0.0015 mol) and toluene (80 mL) was heated to 60° C. At this temperature, KOH (2.1 g, 0.06 mol, in 3 g of water) was added and the reaction mixture was stirred for 1 hr. Glycidyl 2-methyl phenyl ether (5.91 g, 0.036 mole) was added and the reaction temperature was kept at 110° C. for 5 hours. After the reaction is cooled to 60° C., toluene (80 mL) was further added. The solution was precipitated into 300 mL of hexane. After filtration and washing with ethyl acetate (100 mL×3×) and drying in vacuum, a white powder polymer (33.7 g) was obtained. Nuclear magnetic resonance with hydrogen nuclei ($^1$H NMR) showed 12% hydrophobe incorporation. The Brookfield viscosity of a 5% aqueous solution of this oligomer was 67,000 cps (BF LV, S-63, 0.3 rpm at 25° C.). Paint performance: SG10 M (standard formulation) TE %=0.11, Viscosity Loss upon Tinting (VLT)=−4 KU. For UCAR 379 G, TE %=0.54, VLT=−10 KU.

EXAMPLE 2

PEG 35K, 9.3% Addition Level of glycidyl phenyl ether

In a 250 mL, round bottom 3-neck flask equipped with a condenser, a nitrogen in/out let, a mechanical stirrer, a thermo-watch and a heating mantle, a mixture of 40 g of 35,000 Mw PEG (0.0011 mol) and toluene (80 mL) was heated to 60° C. At this temperature, KOH (1.54 g, 0.0275 mol, in 10 g of water) was added and the reaction mixture was stirred for 1 hr. Glycidyl phenyl ether (4.12 g, 0.0275 mole) was added and the reaction temperature was kept at 110° C. for 5 hours. After the reaction was cooled to 60° C., toluene (80 mL) was further added. The solution was precipitated into 300 mL of hexane. After filtration and washing with ethyl acetate (100 mL×3×) and drying in vaccuo, a white polymer (40.5 g) was obtained. $^1$H NMR showed 8% hydrophobe incorporation. The Brookfield viscosity of a 5% aqueous solution of this oligomer was 124,000 cps (BF LV, S-63, 0.3 rpm at 25° C.). Paint performance: SG10 M (standard formulation). TE %=0.14, Viscosity Loss upon Tinting (VLT)=−6 KU. For UCAR 379 G, TE %=0.68, VLT=−13 KU.

EXAMPLE 3

PEG 35K, 10.4% Addition Level of glycidyl 2 methyl phenyl ether

In a 250 mL, round bottom 3-neck flask equipped with a condenser, a nitrogen in/out let, a mechanical stirrer, a thermo-watch and a heating mantle, a mixture of 30 g of 35,000 Mw PEG (0.0015 mol) and toluene (80 mL) was heated to 60° C. At this temperature, KOH (1.15 g, 0.02 mol, in 3 g of water) was added and the reaction mixture was stirred for 1 hour. Glycidyl 2-methyl phenyl ether (3.38 g, 0.02 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vaccuo, a white powder polymer (31 g) was obtained. $^1$H NMR showed 6.8% hydrophobe incorporation. The Brookfield viscosity of a 5% aqueous solution of this oligomer was 184,000 cps (BF LV, S-63, 0.3 rpm at 25° C.). Paint performance: SG10 M (standard formulation) TE %=0.11, Viscosity Loss upon Tinting (VLT)=−12 KU. For UCAR 379 G, TE %=0.57, VLT=−11 KU.

EXAMPLE 4

PEG 20K, 14% of glycidyl 2 methyl phenyl ether

In a 250 mL, round bottom 3-neck flask equipped with a condenser, a nitrogen in/out let, a mechanical stirrer, a thermo-watch, and a heating mantle, a mixture of 30 g of 20,000 Mw PEG (0.0015 mol) and toluene (80 mL) was heated to 60° C. At this temperature, KOH (3.37 g, 0.06 mol, in 3 g of water) was added and the reaction mixture was stirred for 1 hour. Glycidyl 2-methyl phenyl ether (4.93 g, 0.03 mole) was added and the reaction temperature was kept at 110° C. for 5 hours. After the reaction was cooled to 60° C., toluene (80 mL) was further added. The solution was precipitated into 300 mL of hexane. After filtration and washing with ethyl acetate (100 mL×3×) and drying in vacuum, a white powder polymer (33 g) was obtained. The Brookfield viscosity of a 5% aqueous solution of this oligomer was 37,200 cps (BF LV, S-63, 0.3 rpm at 25° C.). Paint performance: SG10 M (standard formulation) TE %=0.12, Viscosity Loss upon Tinting (VLT)=−7 KU. For UCAR 379 G, TE %=0.47, VLT=−8 KU.

EXAMPLE 5

PEG 30K, 27% Addition Level of glycidyl 2 methyl phenyl ether

In a 250 mL, round bottom 3-neck flask equipped with a condenser, a nitrogen in/out let, a mechanical stirrer, a thermo-watch, and a heating mantle, a mixture of 30 g of 12,000 Mw PEG (0.0015 mol) and toluene (80 mL) was heated to 60° C. At this temperature, KOH (1.7 g, 0.03 mol, in 3 g of water) was added and the reaction mixture was stirred for 1 hour. Glycidyl 2-methyl phenyl ether (10.9 g, 0.02 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vacuum, a white powder polymer (35 g) was obtained. $^1$H NMR showed 20% hydrophobe incorporation. The Brookfield viscosity of a 5% aqueous solution of this oligomer was a gel. Paint performance: SG10 M (standard formulation): Not soluble in the paint. For UCAR 379 G, TE %=0.57, VLT=−1 KU.

EXAMPLE 6

PAPE 35K, 6.9% Addition Level of butyl-glycidyl ether

In a 250 mL, round bottom 3-neck flask equipped with a condenser, a nitrogen in/out let, a mechanical stirrer, a thermo-watch, and a heating mantle, a mixture of 30 g of 35,000 Mw PAPE and toluene (80 mL) was heated to 60° C. At this temperature, KOH (0.95 g, 0.02 mol, in 1 g of water) was added and the reaction mixture was stirred for 1 hour. Butyl glycidyl ether (2.23 g, 0.02 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vacuum, a white polymer (30 g) was obtained. $^1$H NMR showed 4.7% hydrophobe incorporation. The viscosity of a 5% aqueous solution of this oligomer was >200,000 cps (BF LV, S-63, 0.3 rpm at 25° C.). Paint performance: SG10 M (standard formulation). TE %=0.11, Viscosity Loss upon Tinting (VLT)=−30 KU. For UCAR 379 G, TE %=0.47, VLT=−35 KU.

EXAMPLE 7

PEG 20K, 16.3% Addition Level of butyl-glycidyl ether

In a 250 mL, round bottom 3-neck flask equipped with a condenser, a nitrogen in/out let, a mechanical stirrer, a thermo-watch, and a heating mantle, a mixture of 30 g of 20,000 Mw PEG (0.0015 mol) and toluene (80 mL) was heated to 60° C. At this temperature, KOH (0.77 g, 0.015 mol, in 1 g of water) was 10 added and the reaction mixture was stirred for 1 hour. Butyl glycidyl ether (5.86 g, 0.045 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vaccuo, a white polymer (31 g) was obtained. $^1$H NMR showed 9.5% hydrophobe incorporation. Paint performance: SG10 M (standard formulation) not dissolved in the paint. For UCAR 379 G, TE %=0.40, VLT=3 KU.

EXAMPLE 8

PEG 35K, 8.2% Addition Level of butyl-glycidyl ether

In a 250 mL, round bottom 3-neck flask equipped with a condenser, a nitrogen in/out let, a mechanical stirrer, a thermo-watch, and a heating mantle, a mixture of 30 g of 35,000 Mw PEG and toluene (80 mL) was heated to 60° C. At this temperature, KOH (0.77 g, 0.02 mol, in 1 g of water) was added and the reaction mixture was stirred for 1 hour. Butyl glycidyl ether (2.68 g, 0.02 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vaccuo, a white polymer (33 g) was obtained. $^1$H NMR showed 7.3% hydrophobe incorporation. The brookfield viscosity of a 5% aqueous solution of this oligomer was 836,000 cps (BF LV, S-63, 0.3 rpm at 25° C.). Paint performance: SG10 M (standard formulation). TE %=0.15, Viscosity Loss upon Tinting (VLT)=−21 KU. For UCAR 379 G, TE %=0.32, VLT=−37 KU.

EXAMPLE 9

PEG 35K, 6% Addition Level of 2-ethyl hexyl-glycidyl ether

In a 250 mL, round bottom 3-neck flask equipped with a condenser, a nitrogen in/out let, a mechanical stirrer, a thermo-watch, and a heating mantle, a mixture of 30 g of 35,000 Mw PEG and toluene (80 mL) was heated to 60° C. At this temperature, KOH (0.77 g, 0.02 mol, in 1 g of water) was added and the reaction mixture was stirred for 1 hour. 2-Ethyl hexyl glycidyl ether (1.91 g, 0.02 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vacuum, a white polymer (31 g) was obtained. $^1$H NMR showed 5.2% hydrophobe incorporation. The Brookfield viscosity of a 5% aqueous solution of this oligomer was >200,000 cps (BF LV, S-63, 0.3 rpm at 25° C.). Paint performance: SG10 M (standard formulation). TE %=0.11, Viscosity Loss upon Tinting (VLT)=−24 KU. For UCAR 379 G, TE %=0.28, VLT=−30 KU.

EXAMPLE 10

PEG 10K, 16.2% Addition Level of C12 glycidyl ether

In a 250 mL, round bottom 3-neck flask equipped with a condenser, a nitrogen in/out let, a mechanical stirrer, a thermo-watch, and a heating mantle, a mixture of 30 g of 10,000 Mw PEG and toluene (80 mL) was heated to 60° C. At this temperature, KOH (1.52 g, 0.04 mol, in 1.5 g of water) was added and the reaction mixture was stirred for 1 hour. Dodecyl glycidyl ether (5.81 g, 0.024 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vacuum, a white polymer (31.8 g) was obtained. $^1$H NMR showed 11% hydrophobe incorporation. The Brookfield viscosity of a 5% aqueous solution of this oligomer was >400000 cps (BF LV, S-63, 0.3 rpm at 25° C.). Paint performance: SG10 M (standard formulation). The material was not soluble in this paint. For UCAR 379 G, TE %=0.52, VLT=−17 KU.

EXAMPLE 11

PEG 10K, 23% Addition Level of C12 glycidyl ether

In a 250 mL, round bottom 3-neck flask equipped with a condenser, a nitrogen in/out let, a mechanical stirrer, a thermo-watch, and a heating mantle, a mixture of 30 g of 10,000 Mw PEG and toluene (80 mL) was heated to 60° C. At this temperature, KOH (2.19 g, 0.04 mol, in 2 g of water) was added and the reaction mixture was stirred for 1 hour. Dodecyl glycidyl ether (8.71 g, 0.04 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vaccuo, a white polymer,(33 g) was obtained. $^1$H NMR showed 11% hydrophobe incorporation. The Brookfield viscosity of a 5% aqueous solution of this oligomer was >200,000 cps (BF LV, S-63, 0.3 rpm at 25° C.). Paint performance: SG10 M (standard formulation). The material was not soluble in this paint. For UCAR 379 G, TE% =0.52, VLT=−6 KU.

EXAMPLE 12

PEG 20K, 7.2% Addition Level of C12 epoxide

In a 250 mL, round bottom 3-neck flask equipped with a condenser, a nitrogen in/out let, a mechanical stirrer, a thermo-watch, and a heating mantle, a mixture of 30 g of 20,000 Mw PEG and toluene (80 mL) was heated to 60° C. At this temperature, KOH (0.67 g, 0.04 mol, in 1 g of water) was added and the reaction mixture was stirred for 1 hour. 1,2-Epoxydodecane (2.33 g, 0.012 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vacuum, a white polymer (31 g) was obtained. $^1$H NMR showed 6% hydrophobe incorporation. The Brookfield viscosity of a 5% aqueous solution of this oligomer was >400,000 cps (BF LV, S-63, 0.3 rpm at 25° C.). Paint performance: SG10 M (standard formulation). The material was not soluble in this paint. For UCAR 379 G, TE %=0.38, VLT=−24 KU.

EXAMPLE 13

PEG 12K, 8.4% Addition Level of C12 epoxide

In a 250 mL, round bottom 3-neck flask equipped with a condenser, a nitrogen in/out let, a mechanical stirrer, a thermo-watch, and a heating mantle, a mixture of 30 g of 12,000 Mw PEG and toluene (80 mL) was heated to 60° C. At this temperature, KOH (0.84 g, 0.015 mol, in 1 g of water) was added and the reaction mixture was stirred for 1 hour. 1,2-Epoxydodecane (2.33 g, 0.012 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vacuum, a white polymer (31.2 g) was obtained. $^1$H NMR showed 7.3% hydrophobe incorporation. The viscosity of a 5% aqueous solution of this oligomer was >400,000 cps (BF LV, S-63, 0.3 rpm at 25° C.). Paint performance: SG10 M (standard formulation). The material was not soluble in this paint. For UCAR 379 G, TE %=0.49, VLT=−4 KU.

EXAMPLE 14

PAPE, 22% of glycidyl 2 methyl phenyl ether

In a 250 mL, round bottom 3-neck flask equipped with a condenser, a nitrogen in/out let, a mechanical stirrer, a thermo-watch, and a heating mantle, a mixture of 50 g of 4,000 Mw PEG (0.012 mol) and NaOH pellets (3 g) was heated at 80° C. for 1 hour. At this temperature, dibromomethane (1.65 g, 9.4 mmol) was added and the reaction mixture was stirred for 4 hours. Glycidyl 2-methyl phenyl ether (14.23 g, 0.09 mole) was added and the reaction temperature was kept at 110° C. for 5 hours. After the reaction mass was cooled to 60° C., toluene (100 g) was further added. The solution was precipitated into 300 mL of hexane. After filtration and washing with ethyl acetate (100 mL×3×) and drying in vacuum, a white powder polymer (50 g) was obtained. $^1$H NMR showed 14.9% hydrophobe incorporation. The Brookfield viscosity of a 5% aqueous solution of this oligomer was 58,800 cps. The Brookfield viscosity of a 25% solution in 25% butyl carbitol was 1,500 cps (BF LV, S-63, 0.3 rpm at 25° C.). Paint performance: SG10 M (standard formulation). TE %=0.30. Viscosity Loss upon Tinting (VLT)=3 KU.

EXAMPLE 15

PAPE, 16% of glycidyl 2 methyl phenyl ether

In a 250 mL, round bottom 3-neck flask equipped with a condenser, a nitrogen in/out let, a mechanical stirrer, a thermo-watch, and a heating mantle, a mixture of 40.6 g of 4,000 Mw PEG (0.01 mol) and NaOH pellets (1.6 g) was heated at 80° C. for 1 hour. At this temperature, dibromomethane (1.32 g, 7.5 mmol) was added and the reaction mixture was stirred for 4 hours. Glycidyl 2-methyl phenyl ether (7.22 g) was added and the reaction temperature was kept at 110° C. for 5 hours. After the reaction mass was cooled to 60° C., toluene (130 g) was further added. The solution was precipitated into 300 mL of hexane. After filtration and washing with ethyl acetate (100 mL×3×) and drying in vaccuo, a white powder polymer (45.5 g) was obtained. $^1$H NMR showed 10.9% hydrophobe incorporation. The Brookfield viscosity of a 5% aqueous solution of this oligomer was 19,000 cps. The Brookfield viscosity of a 25% solution in 25% butyl carbitol was 684 cps (BF LV, S-63, 0.3 rpm at 25° C.). Paint performance: SG10 M (standard formulation). TE %=0.25, Viscosity Loss upon Tinting (VLT)=−1 KU. For UCAR 379 G, TE %=0.63, VLT=−8 KU.

EXAMPLE 16

PEG 20K, 15% of glycidyl 2 methyl phenyl ether

In a 250 mL, round bottom 3-neck flask equipped with a condenser, a nitrogen in/out let, a mechanical stirrer, a thermo-watch, and a heating mantle, a mixture of 20 g of 20,000 Mw PEG (0.0015 mol) and toluene (120 g) was heated to 60° C. At this temperature, KOH (3.4 g, 0.06 mol, in 3.4 g of water) was added and the reaction mixture was stirred for 1 hour. Glycidyl 2-methyl phenyl ether (9.12 g, 0.055 mole) was added and the reaction temperature was kept at 110° C. for 5 hours. After the reaction mass was cooled to 60° C., toluene (80 mL) was further added. The solution was precipitated into 300 mL of hexane. After filtration and washing with ethyl acetate (100 mL×3×) and drying in vaccuo, a white powder polymer (56 g) was obtained. The viscosity of a 5% aqueous solution oligomer was 211,600 cps (BF LV, S-63, 0.3 rpm at 25° C.). Paint performance: SG10 M (standard formulation) TE %=0.18, Viscosity Loss upon Tinting (VLT)=−1 KU. For UCAR 379 G, TE %=0.61, VLT=−5 KU.

The Examples above are summarized in the following Table 1, and compared to the control of commercially available thickener, NLS 200.

TABLE 1

Paint performance for some thickeners

| Samples | Hydrophobe type | Backbone Type | HM % | TE %1 | KU loss | TE %2 |
|---------|----------------|---------------|------|-------|---------|-------|
| Control | C16 | PAPE | 2% | 0.11 | −48 | 0.56 |
| Example 1 | MPGE | PEG, 20K | 12% | 0.11 | −4 | 0.54 |
| 2 | MPGE | PEG, 35K | 8% | 0.14 | −6 | 0.68 |
| 3 | MPGE | PEG, 35K | 7% | 0.11 | −12 | 0.57 |
| 4 | MPGE | PEG, 20K | 9% | 0.12 | −7 | 0.47 |
| 5 | MPGE | PEG, 30K | 20% | Insol. | na | 0.57 |
| 6 | BGE | PAPE, 35K | 5% | 0.11 | −30 | 0.47 |
| 7 | BGE | PEG, 20K | 10% | Insol. | na | 0.4 |
| 8 | BGE | PEG, 35K | 7% | 0.15 | −21 | 0.32 |
| 9 | EHGE | PEG, 35K | 5% | 0.11 | −24 | 0.28 |
| 10 | C12GE | PEG, 10K | 15% | Insol. | na | 0.52 |
| 11 | C12GE | PEG, 10K | 16% | Insol. | na | 0.52 |
| 12 | C12E | PEG, 20K | 6% | Insol. | na | 0.38 |
| 13 | C12E | PEG, 12K | 7% | Insol. | na | 0.49 |
| 14 | MPGE | PAPE, 16K | 15% | 0.3 | 3 | 0.3 |
| 15 | MPGE | PAPE, 20K | 11% | 0.25 | 1 | 0.63 |
| 16 | MPGE | PEG, 20K | 10% | 0.18 | −1 | 0.61 |

MPGE: Methyl Phenyl Glycidyl Ether
BGE: Butyl Glycidyl Ether
EHGE: Ethyl Hexyl Glycidyl Ether
C12GE: Dodecyl Glycidyl Ether
C12E: 1,2 Epoxide Dodecane
PAPE: Polyacetal Polyether
PEG: Polyethyleneglycol
TE %: Thickening efficiency

EXAMPLE 17

Hydrophobically Modified Polyurethane

A mixture of PEG (40 g, Mw=8,000), toluene (50 mL) and 4,4'methylene bis(cyclohexyl isocyanate) (0.9 g) and dibutyltinlaurate (10 mg) was heated together at 80° C. for 16 hours. Methylphenylglycidyl ether (8 g) and NaOH (1 g) were added to the mixture and the reaction was kept at 120° C. for 2 hours. The polymer was precipitated in hexane. After drying, 40 g of a polymer product was obtained (hydrophobe content=2%, Mw=15,000)

EXAMPLE 18

Hydrophobicallly Modified Branched PAPE

A mixture of PEG (40 g, 4,000 Mw), trimethylolpropane ethoxylate (0.4 g), and NaOH (2.4 g) was kept at 80° C. for 1 hour. Dibromomethane (1.8 g) and toluene (30 mL) were added and the mixture was kept at 80° C. for 4 hours. Methylphenylglycidyl ether (4.87 g) was added to the reaction and the temperature was raised to 1,200° C. After 4 hours, the reaction was stopped. Toluene (120 mL) was added to dilute the reaction content. The product was isolated by precipitation in hexane (300 mL) and washing with ethyl acetate. After drying, a polymer (46 g) was obtained. A 5% solution of this material had a Brookfield viscosity of 22,000 cps. Thickening efficiency of this material in SG10M was 0.13. Viscosity loss upon tinting was −23 KU.

EXAMPLE 19

Hydrophobically Modified diisocyanate

A mixture of PEG (60 g, Mw=4,000) was heated with isopherone diisocyanate (1.8 g) and 2 drops of dibutyltinlaurate at 80° C. for 6 hours; then NaOH (1 g) was added. After 1 hour, methylphenylglycidyl ether (6 g) was added. The mixture was heated at 120° C. for 4 hours. A polymer was obtained.

Di-hydroxyl telechelic product of the above process may be further reacted to increase its molecular weight by the addition of coupling reagents bearing two or more hydroxyl reactive groups to make linear or branched polymers that have multiple hydrophobic sections. Typically, di-, tri- or tetra functional compounds used are dihalide, diepoxide, di-urethane, tri-halide, triepoxide, tri-isocyanate. Di-functional coupling molecules would give linear products and polyfunctional coupling molecules would give branched or dendritic products. Each type of product may give advantage for a specific need.

EXAMPLE 20

Linear Coupling using a diisocyanate

A mixture of PEG (600 g, Mw=8,000) was heated with NaOH (12 g) and dibromomethane (8,5 g) at 80° C. for 1 hour; then methyl phenyl glycidyl ether (107 g) was added and heated for 3 hours at 120° C. A polymer product was obtained (Mn=22,000, hydrophobe content 8.2%) after purification by using toluene and hexane. A solution of this polymer (10 g) in toluene (100 mL) was heated with methylene-bis-phenylisocyanate (1.1 g) at 60° C. for 24 hours. A polymer was obtained after precipitation in hexane. The polymer has the number average molecular weight (Mn) of 53,000.

EXAMPLE 21

Linear Coupling using dibromomethane

A mixture of PEG (60 g, Mw=8,000), NaOH (1.2 g), and methylphenylglycidyl ether (8 g) was heated together at 120° C. for 3 hours to give a telechelic oligomer of Mn=9,000. To this reaction mixture of oligomer, dibromomethane (1.6 g) was added at 80° C. After 1 hour, a polymer (62 g) of a number average molecular weight of 19,000 was obtained.

EXAMPLE 22

Linear Coupling using PAPE

A mixture of PEG (27 g, Mw=4,000), NaOH (0.7 g), and methylphenyl glycidylether (6 g) was heated to 120° C. for 2 hours. After the mixture was cooled to 80° C., NaOH (1.5 g), dibromomethane (1.1 g), and PEG (23 g, Mw=4,000) were added and stirred together for 2 hours. After coagulation in hexane and drying, a polymer of Mw=13,000 was collected (52 g). The hydrophobe content was 2%.

In the above Examples, hydrophobes of this invention were built stepwise on the polymer backbone. It is possible to, also, pre-form the hydrophobes of this invention and link them to the polymer backbone of interest like those from isocyanate (HEUR type), cellulosic, acrylate/acrylamide (HASE type), polyvinyl alcohol chemistries as described in the previous section.

It is also possible to use a polymerizable monomer containing hydrophobes of this invention to make different products by polymerizing with other monomers. Polymerizable monomers could be of double bond in nature (like vinyl, maleate, acrylate, acrylamide . . . ), or ring opening in nature (like epoxide, oxazoline, cyclic oxide, cyclic carbonate . . . ). Polymerizable monomers could also be monomers that could participate in a condensation polymerization like a diacid, diester, diol, diamine, dialkyihalides.

EXAMPLE 23

Polystyrene-Terminated PEG

Polystyrene-terminated PEG was synthesized by atom transfer radical polymerization (ATRP). Macroinitiators for ATRP were synthesized by reactions of PEGs (Mw of 8,000, 20,000, 35,000) and 2-chloro-2-phenylacetyl chloride. Then styrene was polymerized in the presence of the macroinitiator to produce polystyrene-terminated PEG, as shown in scheme 2.

Scheme 2. Synthesis of Styrene-Terminated PEG from ATRP

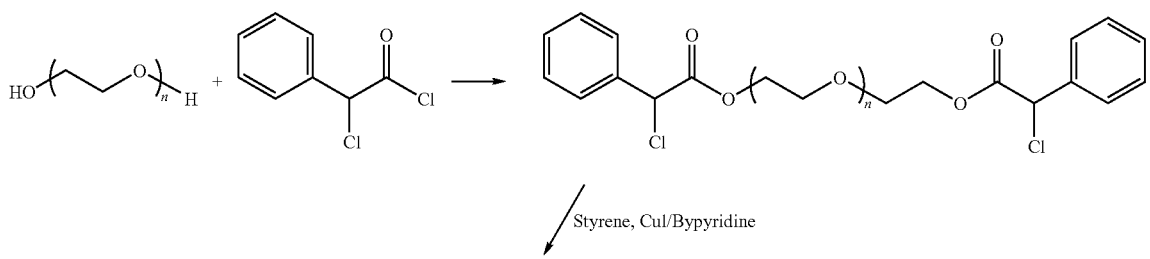

-continued

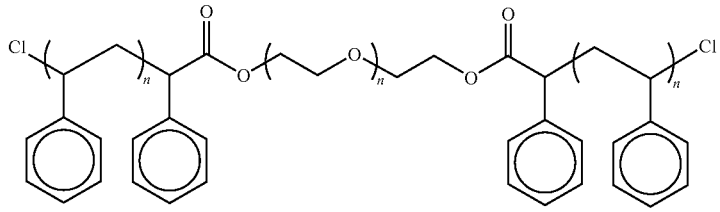

ATRP is a newly developed radical polymerization technique. In the ATRP a transition metal compound acts as a carrier of a halogen atom in a reversible redox process. Its living characteristic allows the incorporation of styrene increasing linearly with time of the polymerization. Several polystyrene-terminated PEG were synthesized from PEG with different molecular weight and with different length of the polystyrene segment, as listed in Table 2.

$^1$H NMR was used to determine the incorporation of phenyl at each end for these triblock polymers after recrystallization to remove small amount of homopolystyrene. The triblock polymer with PEG of 8,000 and 9 phenyls at each end shows limited solubility. The triblock polymer with PEG of 20,000 Mw and 4 phenyls at each end shows low viscosity at 5.0% solids.

Paint evaluation of these triblock polymers was carried out in both UCAR 379 G and SG 10M semi-gloss paints. The results are listed in Table 3 and Table 4.

TABLE 3

UCAR 379 Semi-Gloss Paint Evaluation of Polystyrene-Terminated PEG

| Designation | Efficiency #/100 gallon | Efficiency Wt. % | Stormer Ini | Stormer eq | ICI P | Lev 0-10 | Sag mil | Gloss 60 | ΔKU Ini | ΔKU eq |
|---|---|---|---|---|---|---|---|---|---|---|
| A | 7.01 | 0.66 | 114 | 102 | 0.423 | 0 | 24 | 61 | −12 | −12 |
| B | 8.00 | 0.76 | 85 | 83 | 0.308 | 6 | 8 | 50 | — | −7 |
| C | 10.01 | 0.95 | 89 | 88 | 0.548 | 5 | 8 | 60 | — | −13 |
| D&C Mixture[1] | 12.00 | 1.14 | 80 | 81 | 0.548 | 6 | 6 | 63 | — | −6 |

[1]Weight ratio of this mixture is 4/1.

TABLE 4

SG-10M Semi-Gloss Paint Evaluation of Polystyrene-Terminated PEG

| Designation | Efficiency #/100 gallon | Efficiency Wt. % | Stormer Ini | Stormer eq | ICI P | Lev 0-10 | Sag mil | Gloss 60 | ΔKU ini | ΔKU eq |
|---|---|---|---|---|---|---|---|---|---|---|
| A | 2.10 | 0.20 | 96 | 97 | 0.252 | 0 | 24 | 27 | −5 | −2 |
| B | 2.12 | 0.20 | 94 | 93 | 0.254 | 0 | 24 | 18 | 3 | 4 |
| C | 1.80 | 0.17 | 91 | 91 | 0.267 | 0 | 22 | 50 | −5 | −8 |
| D&C mixture | 3.60 | 0.34 | 96 | 95 | 0.379 | 0 | 24 | 57 | −6 | −5 |

TABLE 2

Synthesis of Polystyrene-terminated PEG

| Designation | PEG (Mw) | Number of Phenyl/Each End | Viscosity[2] cps, (T.S.) |
|---|---|---|---|
| A | 20,000 | 6 | 100,000 (3.5%) |
| B | 8,000 | 5 | 11,800 (4.0%) |
| C | 35,000 | 4 | 34,000 (5.0%) |
| D | 20,000 | 4 | 420 (5.0%) |
| E | 8,000 | 9 | Poor solubility |
| F[1] | 8,000 | 5 | 13,000 (4.0%) |

[1]Repeat of B.
[2]Brookfield viscosity was measured at 22° C.

The application of the product of this invention is not restricted for paint (as demonstrated) but it could be in any applications where two non-compatible phases meet (like oil/water, hydrophobic surface/hydrophilic surface, high surface tension/low surface tension contact). Typical applications may be from dispersion stabilization, emulsion stabilization, emulsion polymerization, paper making drainage aid, paper coating, paper sizing, pitch control in pulping, degreasing formulation, hair care/skin care gel, oil field fluids, concrete rheology control, ceramic green body additive, thermoplastic blends and surface modification.

Although the invention has been illustrated by the above Examples, this is not to be construed as being limited thereby, but rather, the invention encompasses the generic area as hereinbefore disclosed. Various modifications and embodiments can be made without departing from the spirit and scope of the invention.

What is claimed:

1. A polymer composition comprising a water soluble or water swellable synthetic polymer backbone hydrophobically modified with oligomeric hydrophobes having covalently connected ends and/or intermediate blocks of oligomeric hydrophobes that have the following formula:

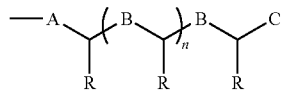

where:
a) n is an integer from 1-100
b) R is CH$_2$OC$_8$H$_{17}$,
c) A is the connecting diradical —O—CH$_2$—,
d) B is the connecting group —O—CH$_2$—,
e) C is a connecting end same as A or a terminating end equal to: —OH, wherein the water soluble or water swellable synthetic polymer backbone is polyacetalpolyether.

2. The composition of claim 1, wherein n has a lower limit of 3.

3. The composition of claim 1, wherein n has a lower limit of 7.

4. The composition of claim 1, wherein n has a lower limit of 10.

5. The composition of claim 1, wherein n has an upper limit of 75.

6. The composition of claim 1, wherein n has an upper limit of 50.

7. The composition of claim 1, wherein n has an upper limit of 20.

8. A process for preparing the water soluble or water swellable polymer composition comprising
a) reacting a water soluble or water swellable backbone with a catalyzing agent in order to activate the polymer backbone and produce a reaction mass,
b) adding an oligomerizing hydrophobic monomer(s) to the reaction mass, and
c) polymerizing the reaction mass at sufficient temperature and for a sufficient time in order to add the oligomerizing hydrophobic monomer(s) to the backbone as end groups and/or intermediate groups to obtain the water soluble or water swellable polymer composition, wherein the backbone is polyacetalpolyether and wherein the water soluble or water swellable polymer composition has covalently connected ends and/or intermediate blocks of oligomeric hydrophobes that have the following formula:
where:

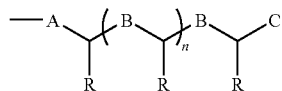

i) n is an integer from 1-100
ii) R is CH$_2$OC$_8$H$_{17}$,
iii) A is the connecting diradical —O—CH$_2$—,
iv) B is the connecting group —OCH$_2$—, and
v) C is a connecting end same as A or a terminating end equal to; —OH.

9. The process of claim 8, wherein the polymer prepared by the process has a weight average molecular weight with an upper limit of about 10,000,000.

10. The process of claim 8, wherein the polymer prepared by the process has a weight average molecular weight with an upper limit of about 1,000,000.

11. The process of claim 8, wherein the polymer prepared by the process has a weight average molecular weight with an upper limit of about 100,000.

12. The process of claim 8, wherein the polymer prepared by the process has a weight average molecular weight with a lower limit of about 400.

13. The process of claim 8, wherein the polymer prepared by the process has a weight average molecular weight with a lower limit of about 1000.

14. The process of claim 8, wherein the polymer prepared by the process has a weight average molecular weight with a lower limit of about 4000.

15. The process of claim 8, wherein the polymer prepared by the process has intermediate blocks of oligomeric hydrophobes that are pendant of the backbone.

16. The process of claim 8, wherein the polymer prepared by the process has intermediate blocks of oligomeric hydrophobes that are internal in the backbone.

17. An aqueous protective coating composition comprising (a) the composition of claim 1, (b) a colorant, and (c) a film forming latex, wherein the viscosity of the coating composition remains unchanged or has an insignificant loss as compared to when using conventional rheology modifiers upon adding a colorant.

18. The aqueous protective coating composition of claim 17, wherein the composition is a latex paint.

19. The aqueous protective coating composition of claim 17, wherein the latex is selected from the group consisting of acrylics, vinyl acrylics, and styrene.

20. The aqueous protective coating composition of claim 19, wherein the latex paint has a pigment volume concentration of from about 15 to about 80.

21. An aqueous protective coating composition comprising a) the polymer composition of claim 1, b) at least one thickener selected from the group consisting of hydrophobically modified ethylene oxide urethane block copolymers, hydrophobically modified alkaline soluble emulsions, cellulose derivative, and polyacetalpolyether, c) a colorant, and d) a film forming latex.

22. The aqueous protective coating composition of claim 21, wherein the cellulose derivative is present and is selected from the group consisting of hydroxyethylcellulose (HEC), hydroxypropyl cellulose (HPC), methylcellulose (MC), carboxymethylcellulose (CMC), methylhydroxy ethylcellulose (MHEC), ethylhydroxyethylcellulose (EHEC), and hydrophobically modified hydroxyethylcellulose (HMHEC).

* * * * *